K. H. LOOMIS.
Nut-Locks.

No. 142,709. Patented September 9, 1873.

Witnesses:
Franck L. Durand
C. L. Everts

Inventor.
Kellogg H. Loomis.
per Alexander Mann
Attorneys.

UNITED STATES PATENT OFFICE.

KELLOGG H. LOOMIS, OF CLEVELAND, OHIO.

IMPROVEMENT IN NUT-LOCKS.

Specification forming part of Letters Patent No. 142,709, dated September 9, 1873; application filed May 14, 1873.

*To all whom it may concern:*

Be it known that I, KELLOGG H. LOOMIS, of Cleveland, in the county of Cuyahoga and in the State of Ohio, have invented certain new and useful Improvements in Nut-Locks; and do hereby declare that the following is a full, clear, and exact description thereof, reference being had to the accompanying drawings and to the letters of reference marked thereon making a part of this specification.

In a former patent for nut-locks granted me I used a washer made of spring-steel and provided with a series of slits and outward projections, against which the inner face of the nut was placed and held by the friction of the spring projections on the washer. In practice it was found that the edges of the metal at the slits would often bind on each other and prevent the proper working of the nut-lock. I also found the narrow slits or cuts in the previous invention would often crack or break through the plate, inasmuch as there was nothing at the ends of said slits or cuts to check the cracking after once being started. In this case I obviate these difficulties by cutting away a piece of the metal at each slit, leaving an open space between the lips of the metal, and then bend one corner of each lip outward.

The nature of my invention therefore consists in a spring-steel washer having a central orifice with pieces of the metal cut out from said orifice toward each corner, forming four lips with open space between them, one corner of each lip being turned outward to hold the nut by the friction of such projections.

Figure 1:
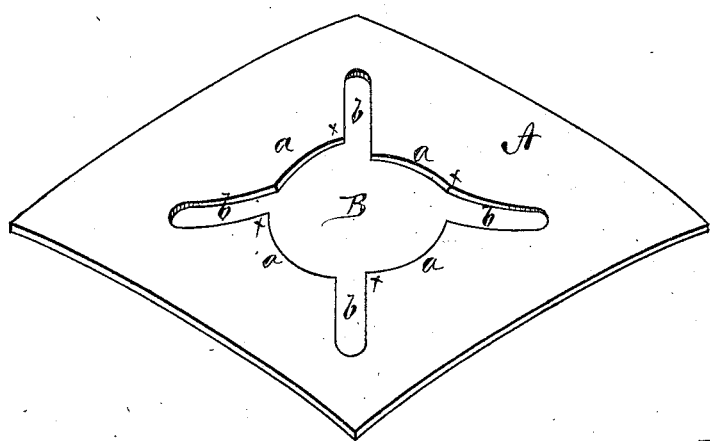
Figure 2:
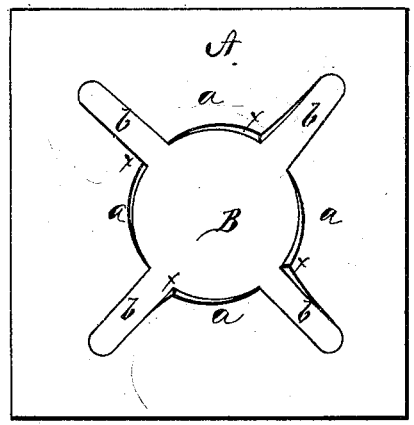

Figure 1 is a perspective view, and Fig. 2 is a plan view of my improved washer.

A represents a flat rectangular piece of spring-steel, in the center of which is cut a circular orifice, B, for the passage of the bolt. From this orifice a piece of the metal is cut out on a line toward each corner, the metal around the orifice, thus forming four lips, $a\,a$, with spaces $b\,b$ between them. One corner, $x$, of each lip $a$, is turned outward, forming a spring projection to hold the nut by friction in precisely the same manner and for the same purposes as described in my patent above re-referred to.

Having thus fully described my invention, what I claim as new, and desire to secure by Letters Patent, is—

A metal washer having a central bolt-hole, from which radiate openings $b\,b$, formed by removing a portion of the metal, and also provided with lips $a\,a$, formed on one corner of each opening, which bear against the back of the nut and hold it by frictional contact, substantially as set forth.

In testimony that I claim the foregoing I have hereunto set my hand this 24th day of April, 1873.

KELLOGG H. LOOMIS.

Witnesses:
A. N. MARR.
C. L. EVERT.